United States Patent

[11] 3,616,863

[72] Inventors Anatoly Karpovich Volosatov
Volgogradsky prospekt, 99, Korpus 3, kv. 39, Moscow;
Georgy Viktorovich Lebedinsky, Kharkov, Sumskaya ulitsa, 9, kv. 6, Kharkov; Nikolai Sergeevich Kabakov, I Institutsky proezd, 4/2, kv. 18, Moscow; Gavriil Mikhailovich Buzenkov, Kutuzovsky prospekt, 30/32, kv. 579, Moscow; Igor Nikolaevich Serebryakov, Kharhov, Pushkinskaya ulitsa, 50/52, kv. 58, Kharkov; Nikolai Andreevich Kitaev, ulitsa Uchinskaya, 1, kv. 47, Moscow, all of U.S.S.R.
[21] Appl. No. 758,295
[22] Filed Sept. 9, 1968
[45] Patented Nov. 2, 1971

[54] SELF-PROPELLED CARRIER
6 Claims, 5 Drawing Figs.
[52] U.S. Cl. .................................................. 172/273, 172/458, 172/484, 212/35
[51] Int. Cl. .................................................. A01b 51/00, A01b 63/00
[50] Field of Search .................................................. 172/484, 272, 273, 274, 485, 483, 1276; 280/460.1, 479, 461.1, 490; 214/75; 212/33, 34, 57, 64, 35; 182/2

[56] References Cited
UNITED STATES PATENTS
2,645,360 7/1953 Raymond .................. 212/64
2,792,127 5/1957 Nielsen .................... 212/35
2,890,043 6/1959 Bruns ...................... 212/35 X
2,927,652 3/1960 Harrington et al. ........ 172/273
3,127,952 4/1964 Baerg ...................... 182/2
FOREIGN PATENTS
978,765 12/1964 Great Britain ............. 212/35
1,014,666 6/1952 France .................... 212/35
Primary Examiner—Robert E. Pulfrey
Assistant Examiner—Stephen C. Pellegrino
Attorney—Waters, Roditi, Schwartz & Nissen ABSTRACT: A carrier for moving an agricultural machine comprises a frame including front and rear portions respectively supported on wheels. A four-bar mechanism is provided for mounting and controlling the agricultural machine in working position. The four-bar mechanism includes a hollow cylindrical post which is rotatably supported on the frame. The post has an axis of rotation about which the four-bar mechanism is rotatable and the post is arranged at the front portion of the frame before the axle of the front wheels. One bar of the four-bar mechanism includes means for coupling the agricultural machine thereto and is arranged when in working position above the frame and between the axles of the front and rear wheels. The four-bar mechanism further includes bottom longitudinal bars which are pivotably connected to both the cylindrical post and to the bar coupled to the agricultural machine. There is also provided an upper longitudinal bar which is pivotably coupled to both the cylindrical post and to the bar coupled to the agricultural machine. A power cylinder is arranged inside of the hollow cylindrical post so as to be able to lift and control the mounted agricultural machine.

SELF-PROPELLED CARRIER

The present invention relates to the field of tractor and agricultural machine building and, more particularly, to self-propelled carriers with a mechanism used for mounting agricultural machines thereon and for controlling the height of the latter.

There are known self-propelled undercarriages with a mechanism for mounting and controlling the height of agricultural machines, said mechanism rotating around its vertical axis.

In the proposed carrier, the mechanism for mounting agricultural machines and controlling their height comprises two four-member linkages with lifting hydraulic cylinders assembled with the aid of the vertical swivel shafts at the ends of the front lateral balance beam of the carrier outside the limits of travel of the front wheels.

Each four member linkage is designed to connect, lift and turn one-half of the agricultural machine from a frontal into an interwheel zone of the carrier with a subsequent interconnection of said halves of the agricultural machine.

The height of the mounted agricultural machine is controlled through hydraulic cylinders of the four member linkage of the mechanism for mounting the agricultural machine and controlling its in height. Said self-propelled carrier with the mechanism for mounting an agricultural machine and controlling its height is disadvantageous in that it does not permit a mounting of the entire machine, and the latter must be disassembled into two halves. This assembly-disassembly operation is lengthy and labor consuming, and moreover, the employment of two four-bar linkages significantly complicates the design of the carrier and increases its size.

Also known are self-propelled carriers with a mechanism for mounting an agricultural machine and controlling its height, wherein said mechanism is made as a three-bar mechanism with one external hydraulic cylinder coupled with said three-bar mechanism and used to control the height of the agricultural machine.

To connect the agricultural machine with the aid of said mechanism, the agricultural machine must be moved under the frame of the carrier from one side thereof.

This carrier suffers from the following disadvantages: each agricultural machine must be equipped with additional supporting wheels; a plane assembly with a hard surface is required; to mount on the carrier agricultural machines, whose height and weight are limited, said machines must be rolled under the carrier frame and then removed after the operation work is over.

The object of the present invention is to develop a self-propelled carrier simple in design and providing for quick mounting of assembled agricultural machines of increased weight under any conditions so that all operations can be performed by one man.

In accordance with these and other objects, the present invention contemplates that in self-propelled carriers comprising a mechanism capable of turning around a vertical shaft and used to mount and control the position of agricultural machines, said shaft is placed in the front part of the carrier frame, within the track of the front wheels, generally in the middle thereof, said mechanism being made so that, when lifted, its elements are a position above said frame, thereby permitting free turning of said mechanism around its shaft.

It is expedient to rigidly mount on the carrier frame, along the axis of rotation of the mechanism, a hollow cylindrical support on which a cylindrical member of the mechanism is mounted and which houses a power cylinder adapted to lift and control the height of the mounted agricultural machine.

It is desirable to bend the lower longitudinal members of the four-bar mechanism so that the middle part of the bars it in a position above their ends.

Other objects and advantages of the present invention will now be described with reference to the accompanying drawings, in which.

For the sake of clarity, specific terminology is used to describe the preferred embodiment of the present invention. However, the invention is not limited by the narrow terms employed and it should be borne in mind that each term embraces all the equivalent elements operating analogously and used to solve similar problems.

The self-propelled carrier comprises: frame 1 (FIGS. 1 and 2,) mechanism 2, in accordance with the invention, for mounting and controlling the height and agricultural machine, support 3 located in the front part of said frame, said support serving as a vertical shaft around which said mechanism rotates, and power cylinder 4 to lift and control the height of an agricultural machine.

Frame 1 is located as low as the carrier clearance permits, thus making it possible to position the frame of an agricultural machine above the frame of the carrier and effect with the aid of said mechanism the connection, lifting and turning from the frontal position into the interwheel zone, as well as the setting in the required zone, of an agricultural machine and controlling its height.

Figure 1:
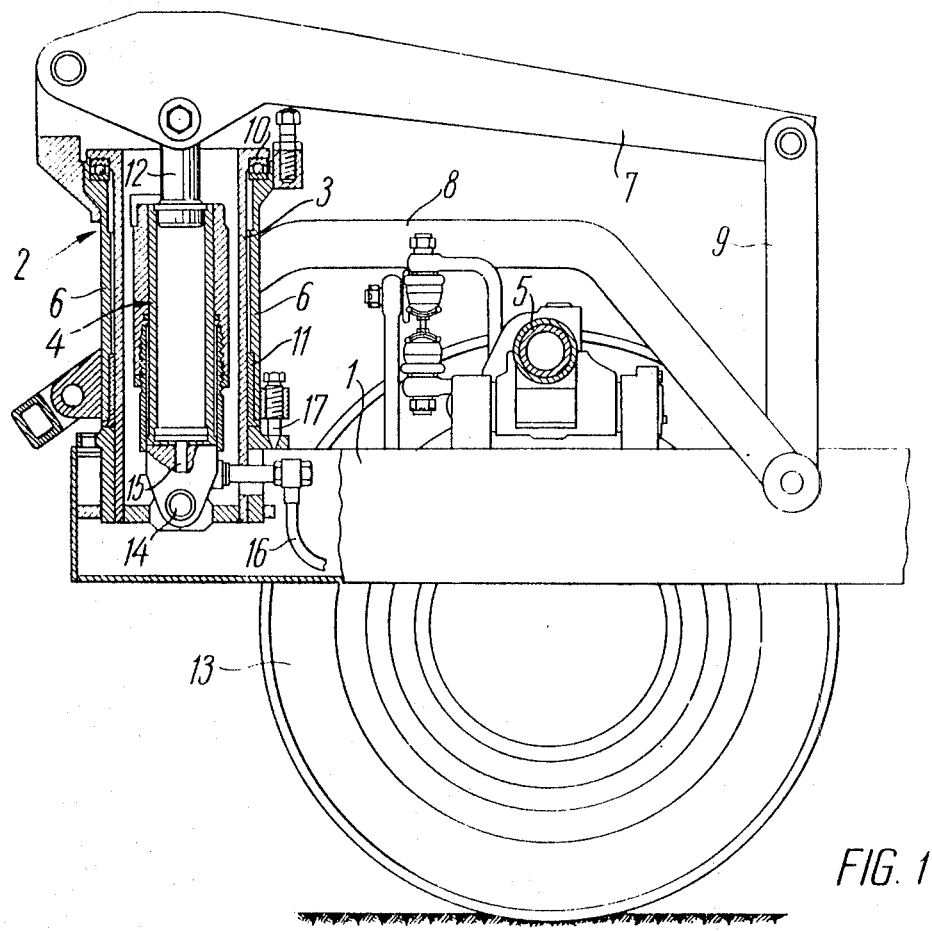
FIG. 1 is a side view in longitudinal section of a mechanism for mounting an agricultural machine on a self-propelled carrier and for controlling the height of this machine, in accordance with the invention.
Figure 2:
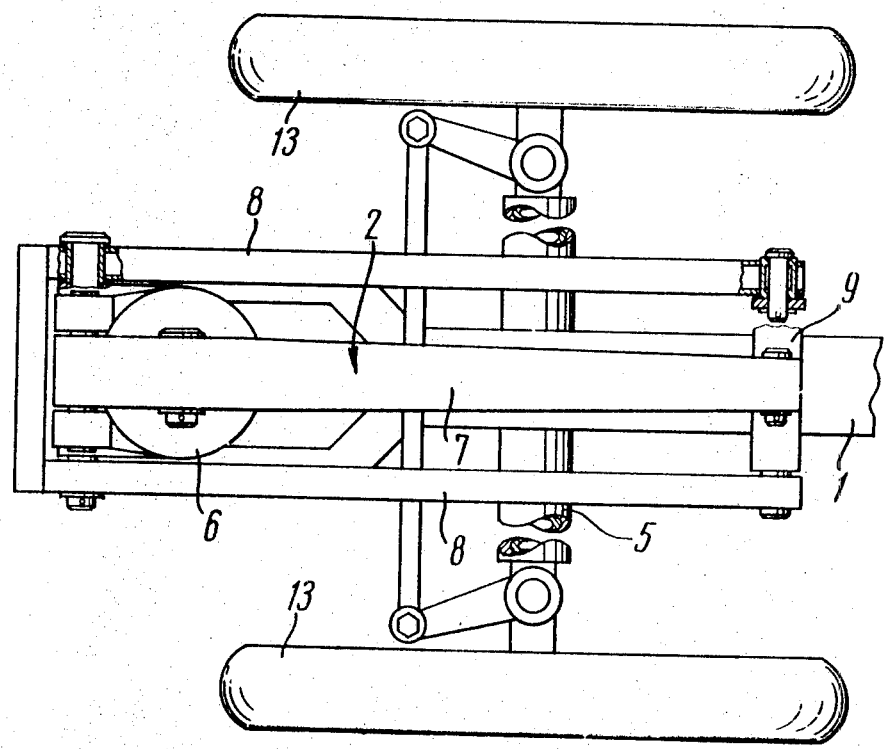
FIG. 2 is a top view of the mechanism of FIG. 1.

Frame 1 is made mainly of one longitudinal beam and can be located both below and above front balance beam 5 which serves to support the stub axles of the front wheels in conventional manner from the frame as shown in FIG. 1 diagrammatically.

Mechanism 2 for mounting and controlling in height an agricultural machine is a four-bar mechanism designed so that, when lifted, all its elements are above frame 1, thus allowing free turning movement around support 3.

The four-bar mechanism consists of vertically arranged cylindrical bar 6, upper and lower longitudinal bars 7 and 8 respectively, whose ends from one side are hinged to cylindrical vertical bar 6, and from the other side are hinged to bar 9, through which an agricultural machine is connected to said mechanism.

Bar 6 of the four-bar mechanism is made hollow; it is installed on support 3 with the aid of rolling friction bearing 10 and sliding friction bearing 11. Upper longitudinal bar 7 is hinged to rod 12 of power cylinder 4.

Lower longitudinal bars 8 are bent upwards to ensure free rotation of mechanism 2 above frame 1 of the carrier. Support 3 is made as a hollow cylinder, fixed to frame 1 in its front part within the limits of the track of the front wheels.

Power cylinder 4 is installed in the cavity of cylindrical support 3 and is connected with frame 1 through hinge 14.

Located in the lower part of power cylinder 4 is channel 15 connected with hose 16 disposed inside frame 1, said hose being utilized for delivering the working medium into power cylinder 4.

The design of power cylinder 4 provides for the possibility of its position outside support 3 and hinged connection to bar 6 of the four-bar mechanism instead of to frame 1; in this case, support 3 is not hollow, and bar 6 can be made, for instance, as two rigidly interconnected rings (this version is not shown in the drawings), Cylindrical bar 6 of the four-bar mechanism has stop screw 17 from the outside, said screw being utilized for fixing mechanism 2 with mounted agricultural machine 18 (FIG. 5) in the operating position.

Mounting and controlling the height of an agricultural machine is effected as follows.

Figure 3:
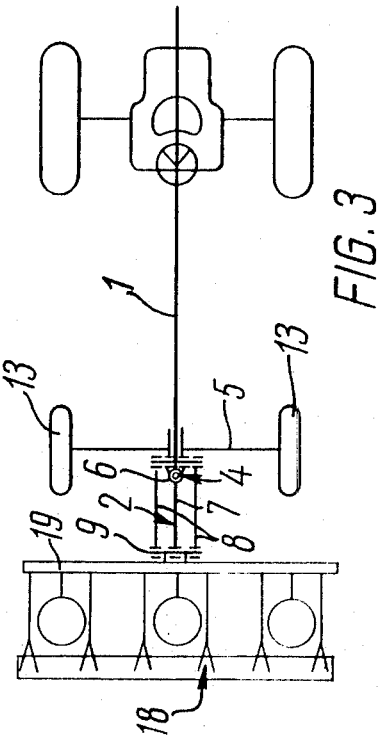
FIG. 3 is a schematic top plan view of an agricultural machine ready to be mounted on a self-propelled carrier.

The self-propelled carrier with mechanism 2, turned into the front position, as shown in FIG. 3, approaches agricultural machine 18, whereupon the latter is connected by means of bar 9 of said mechanism. As soon as power cylinder 4 is operated, rod 12 acts on upper longitudinal bar 7 of the four-bar mechanism and lifts bar 9 together with the agricultural machine 18, as is shown in dotted lines in FIG. 4, so that the elements of the four-bar mechanism and the agricultural machine are raised above frame 1 of the carrier.

Figure 4:
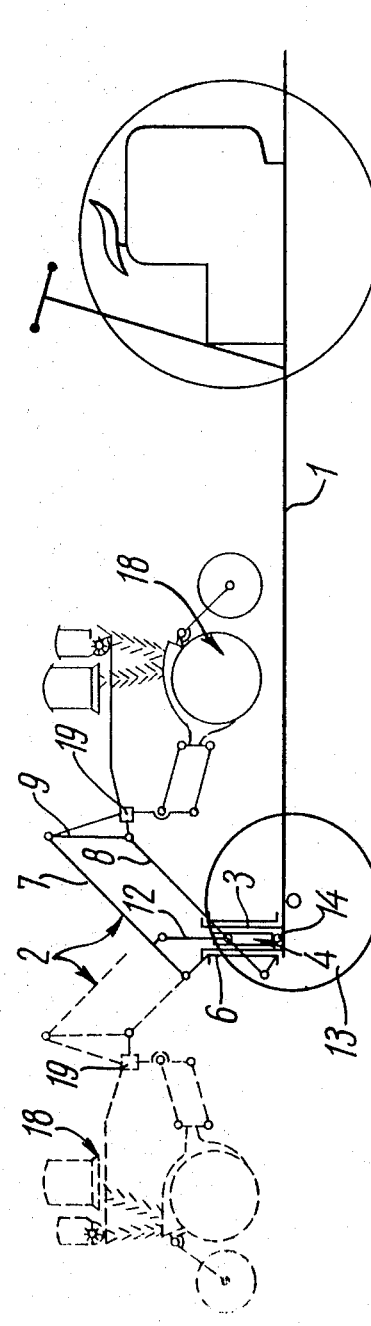
FIG. 4 is a diagrammatic side view of the carrier with a lifted agricultural machine in the position prior to turn (shown in dotted lines) and, after the turn is accomplished, prior to lowering in the operating position (shown in solid lines)

After this, the agricultural machine 18 is moved by the operator in a circle from the frontal position into the interwheel zone, as shown in solid lines in FIG. 4. In this case, agricultural machine 18 is moved with respect to support 3.

Figure 5:
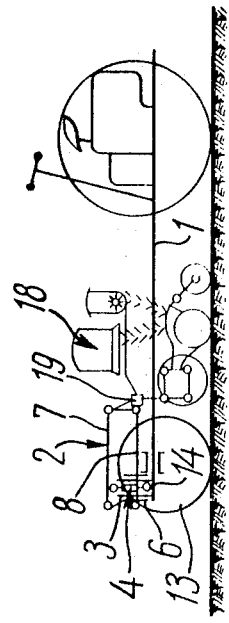
FIG. 5 is a side view of the carrier with an agricultural machine mounted and set in the operating position.

After the power cylinder 4 is cut off, the agricultural machine 18 is lowered in the operating position, as illustrated by FIG. 5. In this position mechanism 2 is fixed by stop screw 17. As is clear from the drawing, frame 19 of the agricultural machine 18 is located above frame 1 of the self-propelled carrier.

The present self-propelled carrier is advantageous in that it allows mounting the agricultural machine above the carrier frame with the aid of mechanism 2 within 2 or 3 minutes and does not require additional supporting wheels with the agricultural machine under any conditions; it also permits to mount agricultural machines of greater weight and dimensions.

Moreover, there is no need to disassemble the agricultural machine in two parts, to be reassembled later on.

Moreover, the self-propelled carrier, according to the invention, will make it possible to develop or use mounted agricultural machines of the type identical with tractor mounted machines.

The advantages of the invention are also its simple design, the possibility to connect an agricultural machine from any position with respect to the longitudinal axis of the carrier.

It should also be noted, that the low position of frame 1 of the carrier provides the driver with a good view to the working members, and makes the working member more available for servicing, as well as it is more convenient for handling operations in case the carrier is used with a cargo platform.

The installation of power cylinder 4 in hollow support 3 ensures the convenient disposition of hose 16 for the delivery of the working medium to power the cylinder 4 inside frame 1 of the carrier and provides for the free rotation of mechanism 2.

The experimental models of the self-propelled carrier, in accordance with the invention, have been tested in the field with very desirable results.

Though the present invention has been described in connection with the preferred embodiment, thereof, it is evident that various changes and modifications may be made without deviation from the idea and scope of the invention, as those skilled in the art will readily understand. Such changes and modifications are to be considered as falling within the spirit and scope of the present invention and the appended claims.

We claim:

1. A self-propelled carrier for moving an agricultural machine comprising: a frame including front and rear portions, said front and rear portions including respective parallel axles and wheels: a four-bar mechanism for mounting and controlling the agricultural machine in working position; said four-bar mechanism including a hollow cylindrical post rotatably installed on the frame, said post having an axis of rotation about which said four-bar mechanism is rotatable and arranged at the front portion of the frame ahead of the axle of the front wheels; one bar of said four-bar mechanism including means for coupling the agricultural machine thereto and arranged when in working position above said frame and between the axles of said front and rear wheels; bottom longitudinal bars of said four-bar mechanism pivotally connected both to said cylindrical post and said one bar; an upper longitudinal bar of said four-bar mechanism also pivotally coupled to both said cylindrical post and said one bar; a balance beam for support of said axle of said front wheels from said frame; said bottom longitudinal bars having a substantially U-shaped middle portion and overlying in spaced relation the top of the balance beam; and a power cylinder arranged inside said cylindrical post, said power cylinder including a shiftable rod hinged to said upper longitudinal bar to lift and controlling the mounted agricultural machine.

2. A carrier as claimed in claim 1 wherein said power cylinder is pivotally connected to said frame internally of said cylindrical post.

3. A carrier as claimed in claim 2 wherein said rod is pivotally connected to said upper longitudinal bar between the pivotal connections of said upper longitudinal bar to said cylindrical post and to said one bar.

4. A carrier as claimed in claim 3 including actuating means for actuating said power cylinder to shift said rod so as to lift the agricultural machine to permit the placement of the latter between the front and rear axles in working position.

5. A carrier as claimed in claim 4 wherein said actuating means includes a hose connected to said power cylinder adjacent the pivotal connection of the latter to said frame.

6. A carrier as claimed in claim 5 including stop means connected to said post and engageable with said frame.

* * * * *